US 10,758,993 B2

(12) United States Patent
Schartner et al.

(10) Patent No.: US 10,758,993 B2
(45) Date of Patent: Sep. 1, 2020

(54) WELDING-TYPE POWER SOURCE WITH INTEGRATED OPEN-CIRCUIT VOLTAGE CONTROLLER

(71) Applicant: Illinois Tool Works Inc., Glenview, IL (US)

(72) Inventors: Quinn W. Schartner, Kaukauna, WI (US); Thomas A. Bunker, De Pere, WI (US)

(73) Assignee: Illinois Tool Works Inc., Glenview, IL (US)

( * ) Notice: Subject to any disclaimer, the term of this patent is extended or adjusted under 35 U.S.C. 154(b) by 333 days.

(21) Appl. No.: 15/701,078

(22) Filed: Sep. 11, 2017

(65) Prior Publication Data
US 2017/0368630 A1 Dec. 28, 2017

Related U.S. Application Data

(63) Continuation of application No. 11/769,261, filed on Jun. 27, 2007, now abandoned.

(60) Provisional application No. 60/941,230, filed on May 31, 2007.

(51) Int. Cl.
*B23K 9/10* (2006.01)
(52) U.S. Cl.
CPC .................................. *B23K 9/1031* (2013.01)
(58) Field of Classification Search
CPC .............................. B23K 9/1031; B23K 9/10
See application file for complete search history.

(56) References Cited

U.S. PATENT DOCUMENTS

| | | |
|---|---|---|
| 3,524,041 A | 8/1970 | Manz |
| 3,934,110 A | 1/1976 | Denis |
| 4,963,715 A | 10/1990 | Tuttle |
| 5,734,147 A | 3/1998 | Bunker et al. |
| 6,023,037 A | 2/2000 | Church et al. |
| 6,115,273 A | 9/2000 | Geissler |
| 6,329,636 B1 | 12/2001 | Geissler |
| 6,333,469 B1 | 12/2001 | Inoue et al. |
| 6,333,489 B1 * | 12/2001 | Reynolds ............. B23K 9/1006 219/130.33 |
| 2004/0245232 A1 | 12/2004 | Ihde et al. |

(Continued)

FOREIGN PATENT DOCUMENTS

| | | |
|---|---|---|
| DE | 4121740 | 1/1991 |
| WO | 095811 | 9/2006 |

OTHER PUBLICATIONS

International Search Report, PCT/US2008/063363, dated Sep. 12, 2008, 2 pages.

*Primary Examiner* — Brian W Jennison
(74) *Attorney, Agent, or Firm* — McAndrews, Held & Malloy, Ltd.

(57) ABSTRACT

A welding-type system and method for operating a welding-type system is disclosed. The system includes a switched power delivery circuit connected to deliver power to output terminals and an open-circuit voltage (OCV) control circuit configured to adjust an operational state of the switched power delivery circuit. A controller is included that is configured to monitor the output terminals to identify an open circuit condition and selectively engage the OCV control circuit to adjust the operational state of the switched power delivery circuit to reduce a voltage of the output power delivered to the output terminals during the open circuit condition.

19 Claims, 4 Drawing Sheets

(56) References Cited

U.S. PATENT DOCUMENTS

2005/0279742 A1 12/2005 Stava
2006/0163227 A1 7/2006 Hillen et al.
2009/0021232 A1 1/2009 Ishino

* cited by examiner

WELDING-TYPE POWER SOURCE WITH INTEGRATED OPEN-CIRCUIT VOLTAGE CONTROLLER

REFERENCE TO RELATED APPLICATIONS

This application is based on provisional application 60/941,230 filed May 31, 2007, entitled "WELDING-TYPE POWER SOURCE WITH INTEGRATED OPEN-CIRCUIT VOLTAGE CONTROLLER," and nonprovisional application Ser. No. 11/769,261 filed on Jun. 27, 2007, entitled "WELDING-TYPE POWER SOURCE WITH INTEGRATED OPEN-CIRCUIT VOLTAGE CONTROLLER," and claims the benefit thereof.

STATEMENT REGARDING FEDERALLY SPONSORED RESEARCH OR DEVELOPMENT

Not applicable.

BACKGROUND OF THE INVENTION

The present invention relates generally to a welding-type system and, more particularly, to a system and method for controlling an open-circuit voltage supplied by the welding-type power source under various conditions.

There are many welding-type systems that are used for a variety of applications. Some welding-type systems, as used herein, include welding systems, plasma cutting systems, and induction heating systems. Accordingly, welding-type power, as used herein, refers to welding, plasma cutting, or induction heating power. One primary component of these welding-type systems is a welding-type power supply that delivers welding-type power conditioned to perform a specific welding-type process. Often, a particular power supply will have a topology and a control scheme chosen or optimized for a particular welding-type application or to deliver a particular welding-type power. For example, a welding power supply might be designed for a metal-inert gas (MIG), tungsten-inert gas (TIG), or stick welding process, to name but a few.

Some welding-type applications utilize a wire feeder that drives a consumable wire electrode to perform a desired welding-type process, such as a MIG welding process. One common type of wire feeder is a voltage sensing wire feeder. Voltage sensing wire feeders, as used herein, include wire feeders that derive operational power from the output voltage provided by a welding-type power supply to drive a desired welding process. Generally, voltage sensing wire feeders become active when the voltage and/or current provided by an associated power supply increases above a threshold value. In this regard, the wire feeder does not typically receive control signals or communicate with the power supply. Because the wire feeder derives operational power from the output of the welding-type power supply, the welding-type power supply must continuously provide a minimum amount of power needed to operate the wire feeder, even during open circuit conditions.

Generally, a typical voltage sense wire feeder requires approximately 1 to 10 watts of power to operate in an idle state and, often, requires in excess of 150-200 watts in a jog or weld state when the wire feeder motor is running. The actual power required is dependent on motor design, wire feed speed and torque. To this end, in an effort to accommodate various design concerns, welding-type power supplies typically provide an output voltage of approximately 15 to 44 volts when driving a welding process, but provide an increased voltage (e.g., approximately 70-80 volts) under open circuit conditions. The increased open circuit voltage helps to create and stabilize the arc. While this increased open circuit voltage (OCV) is desirable for weld process performance, the relatively high OCV is undesirable in some circumstances. For example, a higher voltage will possibly cause the user discomfort in the event the user touches both outputs.

To this end, some attempts have been made to design a power supply or device capable of providing a reduced OCV. However, prior attempts are generally not well-suited for inverter-based, DC welding-type power supplies, especially with the capability to power a voltage sensing wire feeder with reduced open circuit voltage during the idle and jog states.

For example, some phase controlled welding-type power supplies have been designed to provide a reduced OCV. However, these phase controlled welding-type power supplies are, generally, not capable of providing a broad range of power outputs needed to power a wide variety of welding-type processes. That is, unlike inverter-based or "switched" power supplies, phase controlled welding-type power supplies are typically limited to powering stick or MIG welding-processes. Beyond being able to act as a "multi-process" welding-type power source, inverter-based power supplies are often desirable due to a decreased size and weight over other welding-type power supplies, such as phase controlled welding-type power supplies.

Accordingly, voltage reducing devices have been developed that can be arranged between an inverter-based power supply and a welding load and/or wire feeder. These autonomous devices are designed to reduce the open-circuit voltage available at the welding torch. However, such autonomous voltage reducing devices (VRD) have a number of drawbacks. First, these VRDs add to the complexity of the overall system by requiring an autonomous device to be coupled with the welding-type system. Second, since these VRDs are connected between the output terminals of the welding-type power supply and the welding torch, only the OCV available at the welding torch is reduced and the OCV at output terminals of the welding-type power supply is not reduced. Third, these VRDs are not designed to accommodate some devices and processes, such as voltage sensing wire feeders and trigger jogs, because they are generally unable to adequately distinguish between the power draw by a voltage sensing wire feeder or a trigger jog that occurs during open-circuit conditions and initiation of a welding-type process Therefore, it would be desirable to have a switched or inverter-based, DC welding-type power supply capable of powering a voltage sensing wire feeder during idle, jog, and welding conditions, but without delivering an undesirable OCV. Furthermore, it would be desirable to have such a welding-type power source capable of driving a wide variety of welding-type processes with and without voltage sensing wire feeders. Additionally, the reduced open circuit voltage should not interfere with arc starting and arc stability.

BRIEF SUMMARY OF THE INVENTION

The present invention overcomes the aforementioned drawbacks by providing an inverter-based power supply having an integrated VRD. Specifically, the present invention is capable of using the inverter-based power supply to determine connection to a voltage sensing wire feeder and provide a reduced OCV. By integrating a voltage reducing circuit within an inverter-based power supply, cost and overall system complexity is reduced by eliminating the need for an auxiliary power supply to power the wire feeder.

In accordance with one aspect of the present invention, a welding-type system is disclosed that includes a switched power delivery circuit connected to deliver power to output terminals and an open-circuit voltage (OCV) control circuit configured to adjust an operational state of the switched power delivery circuit. A controller is included that is configured to monitor the output terminals to identify an open circuit condition and selectively engage the OCV control circuit to adjust the operational state of the switched power delivery circuit to reduce a voltage of the output power delivered to the output terminals during the open circuit condition.

In accordance with another aspect of the present invention, a welding-type power supply is disclosed that includes a pair of output terminals configured to deliver welding-type power to drive a welding-type process and an inverter configured to switch at a switching frequency to generate alternating current (AC) power. A pulse-width modulation (PWM) controller is configured to generate a plurality of pulses having a minimum pulse width on time to cause the inverter to switch at the switching frequency to generate the AC power. A rectifier is included that is configured to receive the AC power and convert the AC power to the welding-type power delivered to the output terminals. The welding-type power supply also includes a transformer having a primary winding configured to receive the AC power from the inverter and a secondary winding configured to provide the AC power to the rectifier at a secondary winding voltage and a voltage reducing circuit configured to adjust the switching frequency of the inverter to reduce a voltage of the welding-type power delivered to the output terminals. A filter is connected between the output terminals having a capacitance of at least $$C \geq \frac{(\pi \cdot f_S)(Tp_{min})^2(V_S - 10)^2}{11{,}250},$$

where $f_s$ is the switching frequency of the inverter, $Tp_{min}$ is the minimum achievable pulse width on time, and $V_s$ is a non-reduced voltage of the transformer secondary.

In accordance with yet another aspect of the present invention, a welding-type power source is disclosed that includes a housing, a pair of output terminals extending from the housing, and an inverter arranged in the housing and configured to deliver welding-type power to the output terminals. A voltage reducing circuit is arranged in the housing and is configured to reduce a voltage of the welding-type power delivered to the output terminals. A controller is arranged in the housing and is configured to determine an open-circuit condition at the output terminals and selectively engage the voltage reducing circuit to reduce the voltage of the welding-type power delivered to the output terminals during the open-circuit condition.

In accordance with still another aspect of the invention, a method of operating a welding-type power source is disclosed that includes controlling an inverter according to a first technique to deliver a welding-type power to output terminals of the welding-type power source. The method also includes determining connection of a voltage sensing wire feeder connected to the output terminals and monitoring conditions of the welding-type power at the output terminals to determine a beginning of an open-circuit condition. Upon determining connection of the voltage sensing wire feeder connected to the output terminals and the open-circuit condition at the output terminals, the method includes controlling the inverter according to a second technique to deliver a reduced open-circuit voltage to the output terminals.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
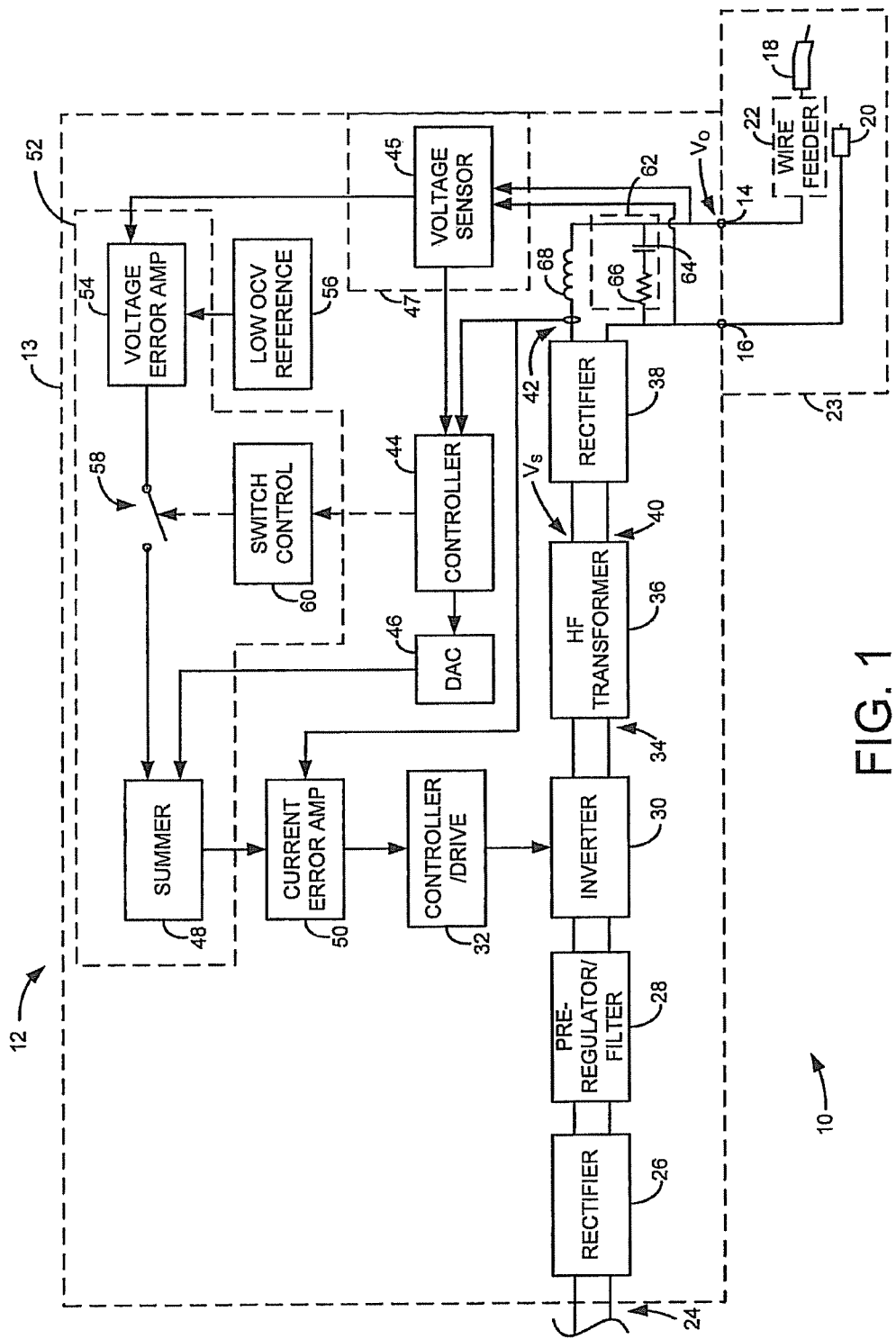
FIG. 1 is a schematic illustration of an inverter-based power source of a welding-type device in accordance with the present invention.

Referring now to FIG. 1, a welding-type system 10 includes a switched power delivery circuit or inverter-based power supply 12 that includes a housing 13 and a pair of output terminals 14, 16 extending from the housing 13. A welding torch 18 and grounding lead 20 may be connected to the output terminals 14, 16 to perform a welding-type process. Additionally, as will be described, a wire feeder 22 may be utilized with the welding-type system 10. Specifically, for example, the wire feeder 22 may be a voltage sensing wire feeder 22 that receives operational power from a connection to the output terminals 14, 16. Therefore, the voltage sensing wire feeder 22 does not include a connection to an auxiliary power source to receive operational power. The components connected to the output terminals 14, 16, such as the welding torch 18, grounding lead 20, and wire feeder 22 collectively form a external welding circuit 23.

The inverter-based power source 12 includes a power input connection 24 that receives AC power, such as received over a traditional transmission power receptacle (not shown). The received power is provided to a rectifier 26 to convert the AC power to DC power. Thereafter, an optional pre-regulator and/or filter 28 may be provided to further condition the power before delivering the DC power to an inverter 30. The inverter 30 includes a plurality of switches that are controlled by a controller/drive circuit 32 to convert the high-voltage DC power to high-voltage, high-frequency AC power. The high-voltage, high-frequency AC power is delivered to a primary side 34 of a high-frequency transformer 36 to convert the high-voltage, high-frequency AC power to low-voltage, high-frequency AC power. Another rectifier 38 receives the low-voltage, high-frequency AC power from a secondary side 40 of the high-frequency transformer 36 and converts the low-voltage, high-frequency AC power to DC, welding-type power for use by the welding torch 18 to effectuate a welding-type process.

During operation, a current sensor 42 monitors the current flow to, and a voltage sensor 45 monitors the voltage at the output terminals 14, 16 to provide feedback to a welding process controller 44, which typically includes a ADC. To this end, as used herein, references to monitoring "power," "power conditions," "power components," and/or "power characteristics" may include power, current, and/or voltage. The controller 44 communicates with a DAC 46 to communicate an output current command that, during normal operation, passes through a summer 48 to act as an output current reference for a current error amplifier 50. The current error amplifier 50 receives the output current reference and compares it to feedback from the current sensor 42 to determine a current error. The current error signal is provided to the controller/drive 32 to generate gating pulses that cause the inverter 30 to switch at a switching frequency necessary to deliver a current to the welding torch 18 having the characteristics designated by the output current command.

Beyond these traditional components of the inverter-based power supply 12, a voltage-reducing device (VRD), also referred to hereafter as an open-circuit voltage (OCV) control circuit, 52 is arranged within the housing 13. As will be described, the VRD 52 forms a circuit configured to reduce the open-circuit voltage available between the output terminals 14, 16. Specifically, the VRD 52 includes a voltage error amplifier 54 that receives feedback from the voltage sensor 45 and a low open-circuit voltage reference value 56. The VRD 52 also includes that aforementioned summer 48, a switch 58, and switch controller 60. As will be described, the switch controller 60 and, thereby, the switch 58, are controlled by the controller 44 to selectively engage the VRD 52.

The VRD 52 is designed to determine an open-circuit condition between the output terminals 14, 16 and, under predetermined conditions, reduce the open-circuit voltage available between the output terminals 14, 16. In particular, the current sensor 42 and the voltage sensor 45 are included to monitor the current and voltage conditions at the output terminals 14, 16. The voltage sensor 45 and associated electrical connections thereto and therefrom form a voltage feedback circuit 47. The controller 44 receives feedback from the sensors 42, 45 and, as will be described, determines whether the feedback is indicative of conditions that would benefit from a low open-circuit voltage between the output terminals 14, 16. In particular, the controller communicates with the switch control 60 to selectively control the switch 58 to engage and disengage the voltage error amplifier 54 that receives feedback from the voltage sensor 45 as a first input and the low open-circuit voltage reference 56 as a second input. When the controller 44 determines that an open-circuit condition is occurring, the controller 44 causes the switch controller 60 to close the switch 58 and commands the DAC output to zero. Accordingly, the voltage error amplifier 54 is connected to the summer 48, which, as will be described below, causes the duty cycle of the inverter to be adjusted to provide a low open-circuit voltage at the output terminals 14, 16.

In this regard, the inverter-based power supply 12 is capable of operating according to nominal and low open-circuit voltage modes during all welding processes. Using the inverter output to regulate the open circuit voltage offers the advantage of not having to add an auxiliary supply to drive the wire feeder motor load. It is contemplated that the nominal open-circuit voltage is approximately 72 volts DC and the average low open-circuit voltage is less than 35 volts DC and, preferably, approximately 25 volts DC with a peak ripple voltage not exceeding 30 volts DC. The specific open-circuit voltage settings are selectable through an internal dip switch setting (not shown) that enables and disables the VRD functionality. However, it is contemplated that changing the dip switch setting may require removal of the housing 13.

To achieve the desired low open-circuit voltage and small ripple voltage, an RC filter 62 is arranged between the output terminals 14, 16 to regulate the average output voltage and reduce the voltage ripple seen at the output terminals 14, 16. The RC filter 62 is a low-pass filter that includes a capacitor 64 in series with a resistor 66 arranged between the output terminals 14, 16. As illustrated, the capacitor 64 and the resistor 66 are arranged between the output terminals 14, 16 after an output inductor 68. However, it is equivalently contemplated that the capacitor 64 and resistor 66 may be arranged elsewhere near the output terminals, for example, with the output inductor 68 arranged between the RC filter 62 and the output terminals 14, 16 or with the output inductor 68 divided between inductors arranged on either side the RC filter 62. The specific parameters of the RC filter 62 are selected based on operational constraints of the inverter-based power supply 12 and will be described below.

Figure 2:
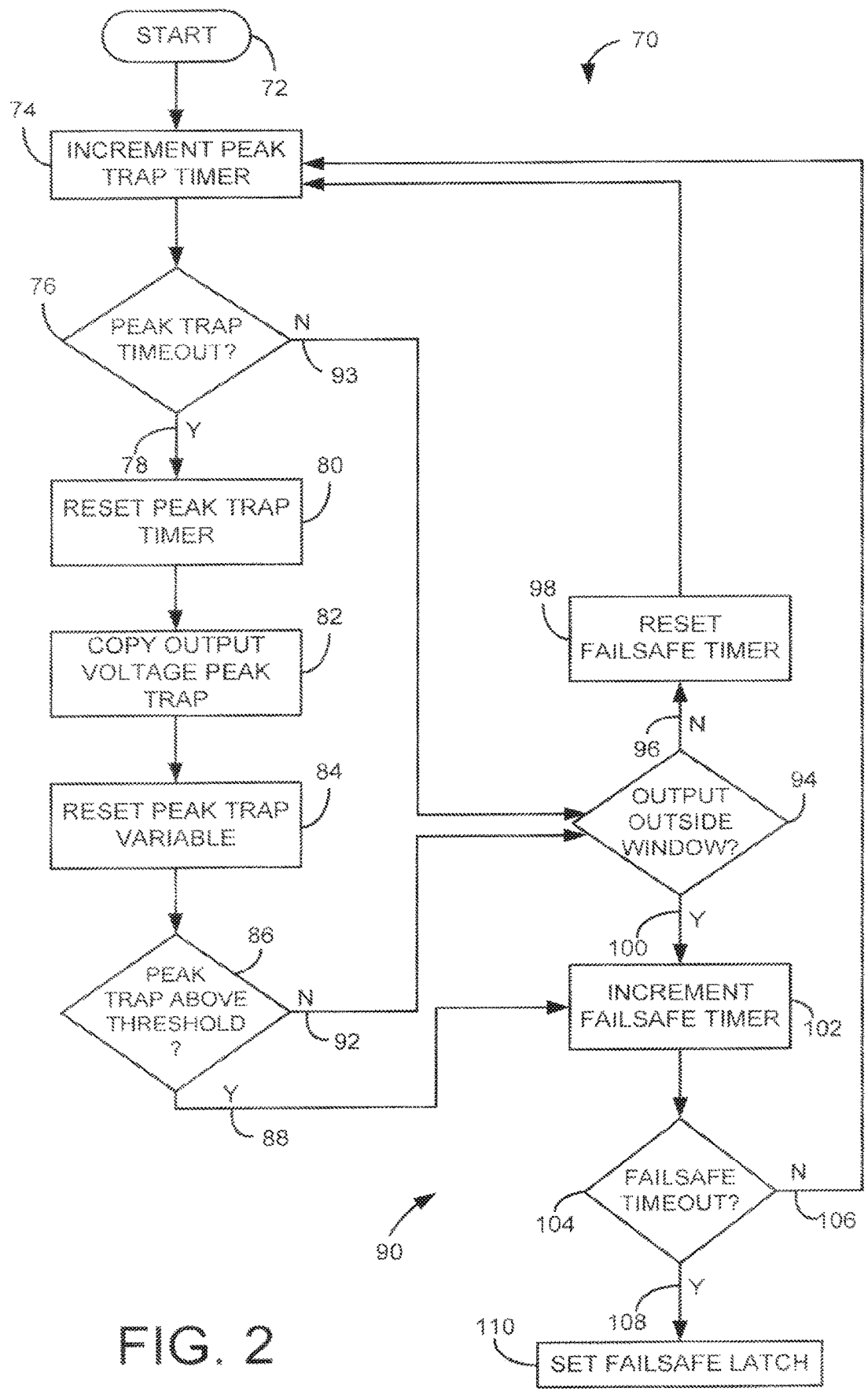
FIG. 2 is a flow chart setting forth the steps for providing a failsafe mechanism in accordance with the present invention.

Referring now to FIG. 2, when low-open circuit mode is selected, the system continuously runs an operation validation process 70. At start 72, a peak trap timer 74 is incremented and checked to determine if a timeout has occurred 76. If so 78, the peak trap timer is reset 80, the output voltage peak trap is copied 82, and the peak trap variable is reset 84. Following this reset process 80, 82, 84, the value of the peak trap is compared to a threshold 86. If the value stored by the peak trap is above the threshold 88, as will be described, a failsafe loop 90 is entered. However, if the value stored by the peak trap is below the threshold 92 or if the peak trap timer has not yet timed out 93, present output voltage is checked against the a window 94. An output voltage value that exceeds the maximum value indicates a component (e.g. voltage error amplifier, output filter) error and an output voltage value that is below the threshold value of the window indicates a poor or missing connection. If the output is within the window 96, the failsafe timer is reset 98 and the system loops back to increment the peak trap timer 74.

If the present output voltage is outside the window 100, the failsafe loop 90 is entered. Upon entering the failsafe loop 90, the failsafe timer is incremented 102 and checked to determine if a timeout has occurred 104. If not 106, the system loops back to increment the peak trap timer 74. However, if the failsafe timer has timed out 108, a lockout is initiated by setting a failsafe latch 110. Simultaneously therewith, it is contemplated that an error message may be displayed to a user to indicate the error that has occurred to initiate the lockout 110. In accordance with one embodiment, it is contemplated that the above-described method is designed to be implemented to enter the failsafe lockout within 1 second.

As stated above, it is contemplated that the inverter-based power supply 12 of FIG. 1 is designed to act as a multi-process power supply to drive a variety of welding-type processes, including TIG, stick, MIG, and the like. Each of the welding processes requires different welding-type power to achieve desired outcomes. These differences are particularly evident in the case of arc starts and outages. Therefore, in order to operate in VRD mode in all processes, while not interfering with arc starts or stability, operation of the VRD is customized to each welding process.

Figure 3:
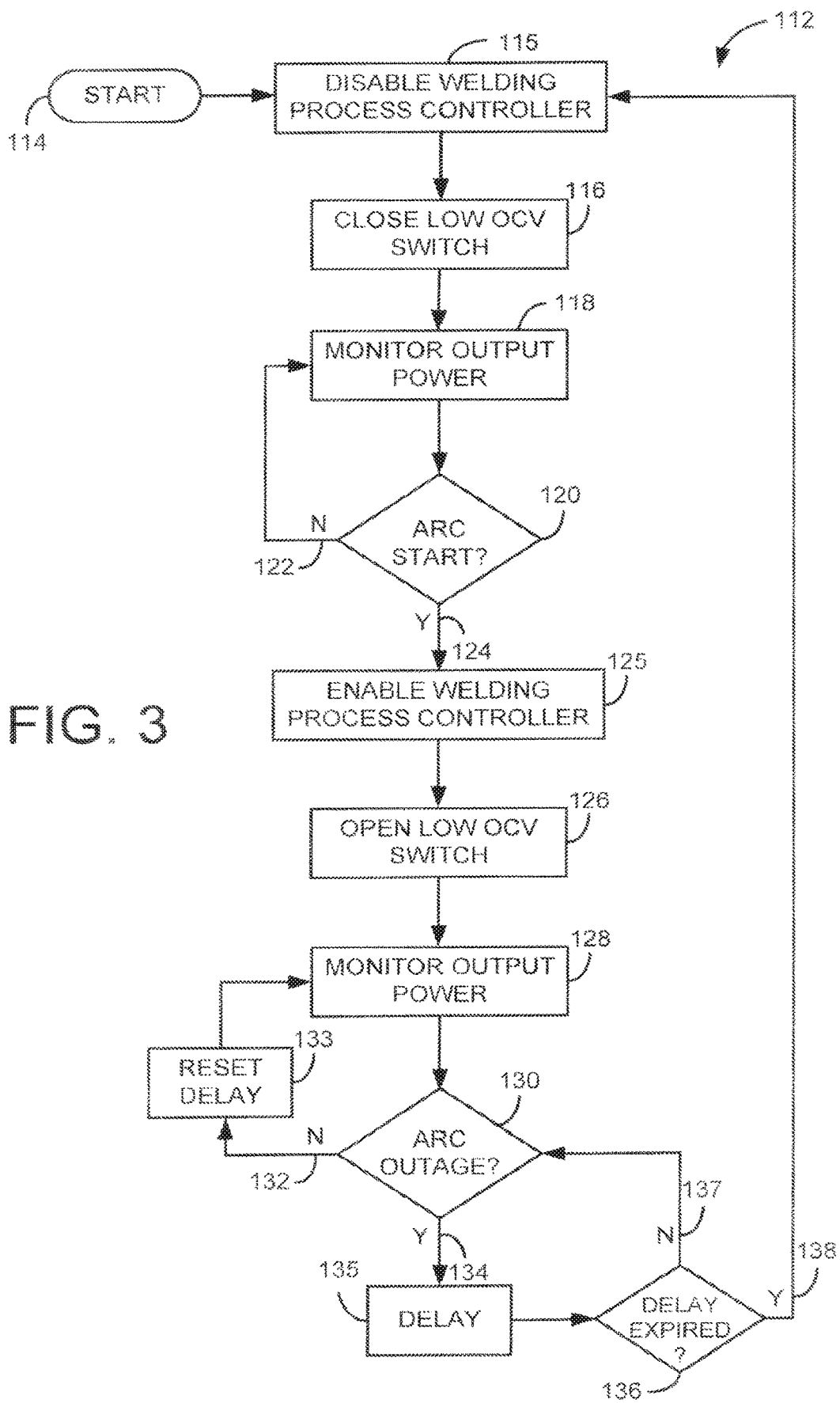
FIG. 3 is a flow chart setting forth the steps for operating a voltage reducing device in accordance with the present invention during a remote MIG mode.

For example, referring now to FIG. 3, the steps 112 for operating the inverter-based power supply 12 of FIG. 1 during a remote MIG mode are shown. In the low OCV remote MIG mode, the process starts 114 by disabling the welding process controller 115 and closing the switch 116. This ensures that the system is providing the low OCV during an initial open circuit condition. The process 112 continues by monitoring the output power 118 of the inverter-based power supply to determine if an arc start condition has been detected 120. Again, references to monitoring "power," "power conditions," "power components," and/or "power characteristics" may include power, current, and/or voltage. If an arc start condition is not detected 122, the open-circuit condition has continued and the switch remains closed until an arc start condition is detected 124 at the output terminals of the power supply. The welding process controller is then re-enabled 125 and the switch is opened 126 to prevent the voltage error amplifier of FIG. 1 from affecting control of the initiated welding-type process.

During the welding-type process, the output power is monitored 128 to determine if an arc outage has been detected 130. As long as an arc outage is not detected 132, a delay is reset 133 and the low OCV switch remains open to keep the VRD disengaged and allow the inverter-based power supply to operate normally. Once an arc outage is detected 134, for example, by the welding circuit resistance exceeding 200 ohms for a given period (e.g., 0.3 seconds), a delay is initiated 135 to keep the switch open for a predetermined time period to sustain the output power delivered to the output terminals in the event of a momentary outage.

In accordance with one embodiment, the delay is set to ensure the open circuit voltage does not remain above 30V for longer than 0.3 seconds to provide sufficient time for the 16 μF filter capacitor to bleed from normal open circuit voltage of approximately 72V down to the desired 30V, assuming a 10k ohm burden. These values are used for exemplary purposes. That is, the resistance of the welding circuit falling below 200 ohms 120 indicates the end of the open-circuit condition and initiation of a welding-type process. In order to meet certain standards, the VRD must not disengage from low open-circuit operation until the weld circuit has fallen below 200 ohms, and must re-engage within 0.3 seconds when the weld circuit rises above 200 ohms.

In any case, the delay is checked 136 to determine if it has expired. If not 137, the VRD remains disengaged. Upon expiration of the delay 138, the process is repeated.

Figure 4:
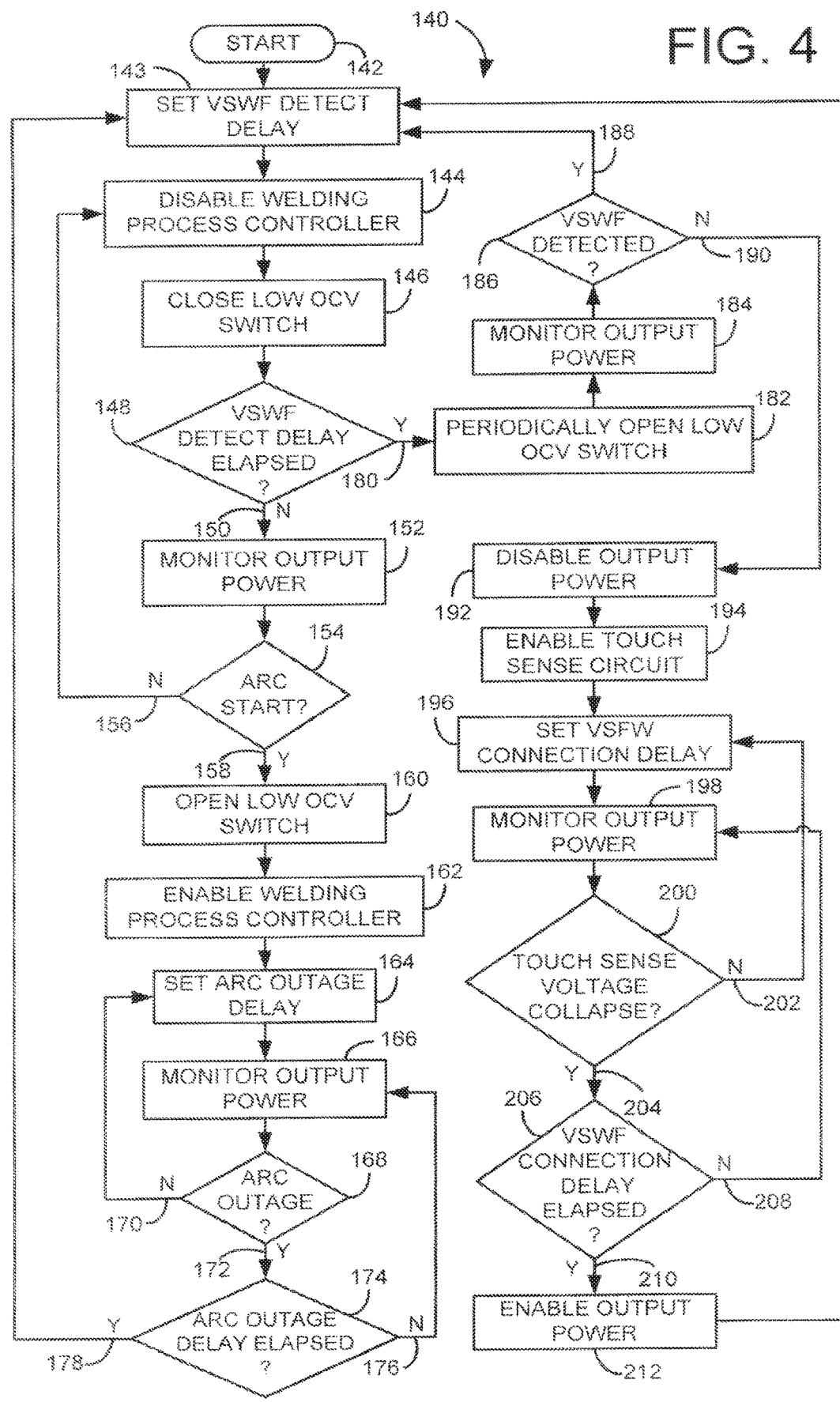
FIG. 4 is a flow chart setting forth the steps for operating a voltage reducing device in accordance with the present invention during a voltage sensing wire feeder mode.

Referring now to FIG. 4, a process 140 for controlling the inverter-based power supply of FIG. 1 during a voltage sensing feeder mode starts 142 by setting a voltage sensing wire feeder (VSWF) detect delay 143, disabling the welding process controller 144, and closing the low OCV switch 146. The process 140 continues by determining if the VSW detect delay has elapsed 148 and, if not 150, the system monitors the output power currently being provided by the welding-type power supply 152 to determine if an arc has been started 154. If no arc has been started 156, the welding process controller remains disabled 144 and the low OCV switch remains closed 146. On the other hand, if an arc has started 158, the low OCV switch is opened 160 and the welding process controller is enabled 162. Thereafter, an arc outage delay is set 164 and the output power is monitored 166 to determine an arc outage 168.

If the arc is sustained 170, the arc outage delay is reset 164. Once the arc has been extinguished 172, the arc outage delay is checked to determine if it has elapsed 174. If the arc outage delay has not yet elapsed 176, the monitoring of the power output is continued 166 to determine if the arc is reestablished 168, 170. Therefore, the arc outage delay provides a buffer in the event of momentary arc outages. However, if the arc outage 172 is sustained for a period sufficient to allow the arc outage delay to elapse 178, the system loops back to set the VSWF detect delay 143, the welding process controller is again disabled 144, and the low OCV switch is opened 146.

Referring back to the check of the VSWF detect delay 148, in accordance with one embodiment, it is contemplated that the VSWF detect delay period may be approximately 0.5 seconds to provide sufficient time for the feeder idle draw to bleed the feeder storage capacitance down below a desired open-circuit voltage, for example, 30 volts. Of course, specific duration of delay 150 is dependent upon both the characteristics of the wire feeder and the desired low open-circuit voltage.

Once the VSWF detect delay has elapsed 180, the low OCV switch is periodically open and reclosed 182 and the power output is monitored 184. In particular, it is contemplated that the switch is periodically opened at a rate of approximately 250 ms. During each period, the switch remains open for one process tick. In accordance with one embodiment, the switch is held open for approximately 500 μsec. During this time, the DAC of FIG. 1 drives the inverter current reference to a low value, for example, about 5 amps. On the next process tick, when the switch is closed, the DAC of FIG. 1 is set to zero and the output voltage response is monitored 184 following this event to determine if a voltage sensing wire feeder is present 186.

In particular, the voltage response during the first 25 msec following switch closing is ignored to allow the ripple voltage to crest at or slightly above the desired low OCV threshold, for example 30 volts, without detection. If the VSWF is detected, the system loops back to set the VSWF detect delay 143. However, if the voltage is above the desired low OCV threshold after the first 25 msec, it is assumed that there is no feeder connected 190. This assumption is based on the fact that a voltage sensing feeder has substantial storage capacitance (generally>2000 μF). This capacitance is in parallel with the output filter of FIG. 1, on the downstream side of a rectifier. Because the capacitance is much greater than the capacitance of the filter, the resulting voltage increase as a result of the 500 μsec constant current pulse is minimal.

Therefore, if no voltage sensing wire feeder is connected 190, the output voltage will increase above the desired low OCV threshold as the filter capacitor is driven well above threshold in 500 μsec. When a voltage above 30V is sensed 190, the output is turned off 192 and a touch sense circuit is enabled 194. The touch sense circuit is designed to provide a very low power voltage signal that is not sufficient to deliver welding type power or power to drive a voltage sensing feeder in the idle or jog state.

The process continues by setting a VSWF connection delay 196 and monitoring the power output 198 to determine if the touch sense voltage has collapsed 200, because the touch sense circuit has limited power capability and collapses once a voltage sensing wire feeder is connected. If not 202, the VSWF connection delay is reset 196 and the power output is monitored 198 until a voltage collapse is determined 204.

Once the touch sense voltage has collapsed 204, the system determines whether the VSWF connection delay has elapsed 206. If not 208, the output power is monitored until the voltage collapse 204 is sustained through the expiration of the VSWF connection delay 210. Hence, the output is not re-enabled 212 until the touch sense voltage collapses 204 and remains below the wire feeder load detect threshold (e.g., approximately 10V) for a predetermined time period 210 (e.g., approximately 2 seconds). Preferably, the VSWF delay is reset anytime the voltage rises above the desired load detect threshold.

Therefore, once a voltage sensing wire feeder is properly connected 212, the output voltage will remain below 30 volts and the VSWF detect delay is again set 143. This prevents the power supply from attempting to provide power to a voltage sensing wire feeder if a poor connection is made and the feeder is connected intermittently. Furthermore, this process reduces the potential for sparking between the feeder sense clip and any conductive work surface when the sense clip is "dragged" across the worksurface or when the sense clip is not properly secured to the worksurface.

Therefore, whenever low open-circuit voltage mode is enabled, the open circuit voltage is reduced to less than 35 volts and, preferably, approximately 25 volts during all open-circuit conditions for all welding processes, except lift-arc TIG. In lift-arc TIG, the open-circuit voltage is further reduced, preferably, to approximately 14 volts using a low power "touch sense" voltage source.

Referring now to FIGS. 1 and 4, the VSWF detect delay 143 significantly aids in reliable detection of an associated wire feeder 22 because the system cannot determine connection to the wire feeder 22 by detecting a voltage presented by the storage capacitors (now shown) of the wire feeder 22 unless the wire feeder rectifier diodes (now shown) are forward biased. However, the rectifier diodes will not become forward biased until the voltage presented by the capacitance of the wire feeder 22 falls below the output voltage provided by the power supply 12.

Since the capacitance of the wire feeder 22 is much greater than the filter capacitor 64 of the power supply 12, these capacitances are both driven to the normal open-circuit voltage following each arc outage. As described above, when the power source 12 recognizes the arc outage, the VRD 52 is enabled. The filter capacitor 64 of the power supply 12 must first discharge through the resistance (for example, 10k ohm) before the voltage falls within regulation. Likewise, the idle draw of the wire feeder 22 discharges the storage capacitance of the wire feeder 22. In this regard, it is contemplated that the time constant of the RC filter 62 in the power supply 12 is less than that of the wire feeder 22 so that the rectifier diodes of the wire feeder 22 become reverse biased. The time delay 150 allows time for the idle draw of the wire feeder 22 to bleed the voltage from its storage capacitors. If the power supply 12 commands the 500 µsec constant current pulse before expiration of the VSWF detect delay 180, the filter capacitor 64 in the power supply 12 will be charged to the voltage of the wire feeder 22. If the voltage is above the desired low OCV threshold (e.g., 30 volts), the system assumes that the wire feeder 22 has been disconnected 190 and triggers another wire feeder load detection. When this happens, the power to the wire feeder is interrupted for at least the time delay used to confirm a touch sense voltage collapse (e.g., 2 seconds) and the next arc strike is delayed by at least that time.

Referring to FIG. 1, if the desired low open-circuit voltage at the output terminals 14, 16, $V_o(f)$, is selected to be 35 volts DC and the maximum tolerated ripple voltage, $V_o(i)$, is selected to be 10 volts DC, the value of the inductor 68 is indirectly selected by the value of the capacitor 64, or vice versa. Specifically, the value of the inductor 68 is given by:

$$L = \frac{X_L}{2\pi \cdot 2f_s}; \qquad \text{Eqn. 1}$$

where $f_s$ is the switching frequency of the inverter 30. In this regard, the value of the capacitor 64 is given by:

$$C \geq \frac{(dt)^2(V_S - V_O(i))^2}{L(V_O(f)^2 - V_O(i)^2)}; \qquad \text{Eqn. 2}$$

where dt is the amount of time that the switch 58 is on closed ($t_{OFF}$ minus $t_{ON}$), $V_S$ is the "normal" or non-reduced voltage at the secondary winding 40 the transformer 36, $V_o$ is the voltage at the output terminals 14, 16, $V_o(i)$ is the output voltage at the switch on time ($t_{ON}$), and $V_o(f)$ is the output voltage when i is equal to zero.

Equation 2 can be rewritten by substituting Eqn. 1 into Eqn. 2 as:

$$C \geq \frac{4\pi \cdot f_S(dt)^2(V_S - V_O(i))^2}{X_L(V_O(f)^2 - V_O(i)^2)}; \qquad \text{Eqn. 3}$$

Assuming a minimum required $X_L$ for an inverter-based power supply of more than 4, a reasonable physical limitation for $X_L(max)$ of approximately ten times $X_L$ for a stepped inductor, a value of $V_o(f)$ of 35 volts, and a value of $V_o(i)$ of 10 volts, Eqn. 3 becomes:

$$C \geq \frac{(\pi \cdot f_S)(Tp_{min})^2(V_S - 10)^2}{11,250}; \qquad \text{Eqn. 4}$$

where $Tp_{min}$ is the minimum achievable pulse width on time. Further assuming a switching frequency of 25 kHz, a minimum switching on time of about 2.50 us, and an initial open-circuit voltage ($V_S$) of 72 volts DC, the value of the capacitor should be selected to be greater than 0.167 uF. To this end, a capacitor value of 16 µF and a resistance value of 0.5 ohms is desirable.

Therefore, using a 16 µF capacitor 64 and a 0.5 ohm, 50 W resistor 66, the inductor 68 is approximately 25 µH. At a switching frequency of approximately 25 kHz, the capacitor 64 and inductor 68 present an impedance of approximately 0.2 ohms and 7.8 ohms, respectively. The characteristic impedance is 1.25 ohms and the corner frequency is 8 kHz. The capacitor 64 provides enough energy storage at the target open circuit voltage such that the ripple voltage resulting from the minimum achievable inverter pulse width ($Tp_{min}$) remains below a desired threshold, for example 30 volts DC. Under weld power conditions, the switching frequency transitions out of discontinuous mode and operates at 50 kHz. The RC filter 62 provides a low impedance AC coupled path at this frequency. The amount of ripple current in the filter 62 is a function of the load voltage and secondary loop impedance. In general, the filter 62 circulates a percentage of the ripple current inside the inverter-based power supply 12 that would otherwise be present in the secondary loop. The 0.5 ohm resistor 66 limits the capacitor ripple current and provides dampening to prevent oscillation. Preferably, the circuit is underdamped. The value of the resistor 66 is chosen based on the specific output load voltages and impedances desired and; therefore, may vary with the specific design constraints of a given inverter-based power supply 12.

While it is recognized that the average output voltage can be regulated without an RC filter 62, the peak voltage under open-circuit conditions can approach the nominal open-circuit voltage level. The RC filter 62 also reduces the magnitude of the ripple current in the external weld circuit and; therefore, reduces noise coupling between the weld circuit and external control circuits that may be in close proximity.

Generally, the system operates similar to this in each of the other welding processes, without the added complexity of detecting when the feeder is connected. However, the output voltage and current conditions indicative of an arc start or arc outage, are dependent on the specific welding process. Therefore, in order to operate in VRD mode without interfering with arc starting or stability, the weld process controller monitors the output conditions, and based on welding process, selectively engages the VRD.

The above-described systems and methods can be user selected to engage when a constant voltage (CV) welding-type process is selected.

Advantageously, these systems and methods provide a low OCV to a wire feeder during both idle and jog states. Sufficient power is provided in both states even though when in the idle state the wire feeder draw is typically between 1 W and 10 W and the power draw in jog state can be greater than 200 W. Generally, a threshold of about 30 volts is desirable as the maximum open-circuit voltage. However, the specific threshold can be selected as desired. The voltage remains below the threshold in the jog state to ensure that "trigger" jogging wire while changing a contact would not expose an operator to more than the desired threshold voltage. In this regard, it is contemplated that the desired low open-circuit voltage may be less than 30 volts, for example, 24 volts, to provide enough voltage to start any voltage sensing wire feeder, while providing a favorable margin to stay below the maximum open circuit threshold.

In some cases, the voltage may exceed the maximum threshold immediately following arc outage for a period of less than a second, for example, less than 0.3 seconds. However, this time delay can be chosen as desired.

Preferably, the open circuit voltage is regulated by feedback correction from an analog voltage error amplifier. An analog amplifier was used instead of a software-based voltage correction loop because, in accordance with one embodiment, the voltage correction loop executes at a rate of 100 μsec, which requires a processor with significantly high bandwidth to utilize a software-based topology. However, it is contemplated that a software solution may also be utilized. The output of the error amplifier is conditionally connected/disconnected to the inverter current reference using a switch. A microcontroller controls the state of the switch. In one embodiment, the switch is only closed when the low open-circuit mode is selected. When the switch is closed, the error amplifier has independent control over the current reference.

Therefore, the above-described system and method for operating an inverter-based power supply having an integrated VRD is provided. By using the inverter-based power supply to determine connection to a voltage sensing wire feeder, cost and overall system complexity is reduced by eliminating the need for an auxiliary power supply to power the wire feeder. Additionally, the output filter provides stable regulation of the output voltage and controls peak voltage transients to, thereby, reduce current ripples in the external welding circuit.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A welding-type power source comprising:
   an inverter configured to deliver welding-type power to output terminals of the welding-type power source;
   a controller configured to:
   determine a connection of a voltage sensing wire feeder connected to the output terminals;
   monitor conditions of the welding-type power at the output terminals to determine an open-circuit condition; and
   control the inverter to deliver a reduced open-circuit voltage to the output terminals in response to determining that the voltage sensing wire feeder is connected to the output terminals and determining the open-circuit condition, wherein the controller is configured to adjust a duty cycle of the inverter to deliver the reduced open-circuit voltage.

2. The welding-type power source of claim 1, wherein the controller is configured to control the inverter to deliver the welding-type power to the output terminals in response to determining that the open-circuit condition has ended.

3. The welding-type power source of claim 1, wherein the controller is configured to:
   control the inverter to switch between delivering the welding-type power and delivering the reduced open-circuit voltage;
   monitor a voltage output in response to the switching; and
   identify a voltage at the output terminals associated with the voltage sensing wire feeder when the monitored voltage output is below a low open-circuit voltage threshold level.

4. The welding-type power source of claim 3, wherein the controller is configured to delay the switching to allow a voltage stored in a capacitor of the voltage sensing wire feeder to fall below a voltage provided to the output terminals.

5. The welding-type power source of claim 4, wherein the delay has a duration of approximately 0.5 seconds.

6. The welding-type power source of claim 1, further comprising a filter configured to regulate an average output voltage and reduce voltage ripples at the output terminals.

7. The welding-type power supply of claim 6, wherein the filter is a resistor-capacitor (RC) filter.

8. The welding-type power source of claim 7, wherein the RC filter between the output terminals has a capacitance of at least:

$$C \geq \frac{(\pi \cdot f_S)(Tp_{min})^2 (V_S - 10)^2}{11{,}250};$$

where $f_s$ is a switching frequency of the inverter, $Tp_{min}$ is a minimum achievable pulse width on time, and $V_s$ is a non-reduced voltage of a transformer secondary of a transformer connected to the inverter.

9. The welding-type power source of claim 1, wherein the inverter is configured to deliver the reduced open-circuit voltage at a voltage at the output terminals to operate the voltage sensing wire feeder during idle and jog conditions.

10. A method of operating a welding-type power source, comprising:
controlling an inverter to deliver a welding-type power to output terminals of the welding-type power source;
determining connection of a voltage sensing wire feeder connected to the output terminals;
monitoring conditions of the welding-type power at the output terminals to determine an open-circuit condition;
comparing a voltage at the output terminals to a predetermined voltage window;
engaging a failsafe lockout if the voltage is outside the predetermined voltage window for a predetermined time interval; and
controlling the inverter to deliver a reduced open-circuit voltage to the output terminals in response to determining that the voltage sensing wire feeder is connected to the output terminals and determining the open-circuit condition.

11. The method of claim 10, further comprising controlling the inverter to deliver the welding-type power to the output terminals in response to determining that the open-circuit condition has ended.

12. The method of claim 10, wherein the determining of the connection of the voltage sensing wire feeder further includes:
switching between controlling the inverter to deliver the welding-type power and controlling the inverter to deliver the reduced open-circuit voltage;
monitor a voltage output in response to the switching; and
identifying a voltage at the output terminals associated with the voltage sensing wire feeder when the monitored voltage output is below a low open-circuit voltage threshold level.

13. The method of claim 12, further comprising delaying the switching to allow a voltage stored in a capacitor of the voltage sensing wire feeder to fall below a voltage provided to the output terminals.

14. The method of claim 13, wherein the step of delaying has a duration of approximately 0.5 seconds.

15. The method of claim 10, further comprising filtering to regulate an average output voltage and reduce voltage ripples at the output terminals.

16. The method of claim 15, wherein the filtering includes applying an RC filter between the output terminals, having a capacitance of at least:

$$C \geq \frac{(\pi \cdot f_S)(Tp_{min})^2(V_S - 10)^2}{11{,}250};$$

where $f_s$ is a switching frequency of the inverter, $Tp_{min}$ is a minimum achievable pulse width on time, and $V_s$ is a non-reduced voltage of a transformer secondary of a transformer connected to the inverter.

17. The method of claim 10, wherein the controlling of the inverter to deliver the reduced open-circuit voltage includes adjusting a duty cycle of the inverter.

18. The method of claim 10, wherein the controlling of the inverter to deliver the reduced open-circuit voltage includes maintaining a sufficient voltage at the output terminals to operate the voltage sensing wire feeder during idle and jog conditions.

19. A welding-type power source comprising:
an inverter configured to deliver welding-type power to output terminals of the welding-type power source;
a controller configured to:
determine a connection of a voltage sensing wire feeder connected to the output terminals;
monitor conditions of the welding-type power at the output terminals to determine an open-circuit condition; and
control the inverter to deliver a reduced open-circuit voltage to the output terminals in response to determining that the voltage sensing wire feeder is connected to the output terminals and determining the open-circuit condition; and
a resistor-capacitor (RC) filter between the output terminals having a capacitance of at least:

$$C \geq \frac{(\pi \cdot f_S)(Tp_{min})^2(V_S - 10)^2}{11{,}250};$$

where $f_s$ is a switching frequency of the inverter, $Tp_{min}$ is a minimum achievable pulse width on time, and $V_s$ is a non-reduced voltage of a transformer secondary of a transformer connected to the inverter.

* * * * *